(12) United States Patent
Wang (10) Patent No.: US 10,277,623 B2
(45) Date of Patent: Apr. 30, 2019

(54) METHOD OF DETECTION OF COMPTROMISED ACCOUNTS

(71) Applicant: AppBugs, INC., Redmond, WA (US)

(72) Inventor: Rui Wang, Redmond, WA (US)

(73) Assignee: AppBugs, INC., Redmond, WA (US)

( * ) Notice: Subject to any disclaimer, the term of this patent is extended or adjusted under 35 U.S.C. 154(b) by 276 days.

(21) Appl. No.: 15/075,077

(22) Filed: Mar. 18, 2016

(65) Prior Publication Data

US 2017/0272461 A1    Sep. 21, 2017

(51) Int. Cl.
*H04L 29/06* (2006.01)
*H04L 9/00* (2006.01)
*H04L 9/32* (2006.01)
*G06F 21/62* (2013.01)

(52) U.S. Cl.
CPC .......... *H04L 63/1441* (2013.01); *H04L 9/002* (2013.01); *H04L 9/3226* (2013.01); *H04L 9/3236* (2013.01); *H04L 63/083* (2013.01); *G06F 21/6254* (2013.01); *H04L 63/06* (2013.01); *H04L 2209/42* (2013.01)

(58) Field of Classification Search
CPC . H04L 9/3236; H04L 63/083; H04L 2209/42; H04L 63/06; G06Q 20/04; G06F 21/6254
USPC ............................................................ 726/5
See application file for complete search history.

(56) References Cited

U.S. PATENT DOCUMENTS

| | | | | |
|---|---|---|---|---|
| 5,491,752 | A * | 2/1996 | Kaufman | G06F 21/335 380/30 |
| 8,495,379 | B2 * | 7/2013 | Rane | H04L 9/0836 380/44 |
| 8,826,023 | B1 * | 9/2014 | Harmer | G06F 21/6227 380/28 |
| 9,071,645 | B2 * | 6/2015 | Henderson | G06F 21/46 |
| 9,379,896 | B1 * | 6/2016 | Altman | H04L 9/3236 |
| 9,698,990 | B1 * | 7/2017 | O'Dell | H04L 9/0662 |
| 9,961,053 | B2 * | 5/2018 | Yedidi | H04L 63/06 |
| 2008/0283593 | A1 * | 11/2008 | He | G06Q 20/04 235/380 |
| 2008/0319889 | A1 * | 12/2008 | Hammad | G06Q 20/04 705/35 |
| 2010/0037060 | A1 * | 2/2010 | Irvine | G06F 21/6236 713/176 |
| 2012/0167225 | A1 * | 6/2012 | Gomez | G06F 21/46 726/26 |
| 2017/0346797 | A1 * | 11/2017 | Yedidi | H04L 63/06 |
| 2018/0189520 | A1 * | 7/2018 | Wang | H04L 9/3236 |

* cited by examiner

Primary Examiner — Bryan F Wright
(74) Attorney, Agent, or Firm — Zhihua Han (57) ABSTRACT

Processes and systems described herein enable a computing device to detect compromised accounts. The computing device may obtain a user credential including a user ID, and further modify the user ID. The computing device may transmit the modified user ID to a service including a database related to compromised accounts, receive a record corresponding to the modified user ID that includes information of a compromised account, and further determine whether an account of the user ID is compromised based on the received record.

12 Claims, 5 Drawing Sheets

| ID | email_address | password | hash_method |
|---|---|---|---|
| 1 | moc.361@aaa | 3es4de7e | bcrypt |
| 2 | moc.liamg@zyx | Xdu64edw | bcrypt,md5 |
| 3 | moc.liamtoh@gfdre | Xejso86tged | bcrypt,sha1 |
| 4 | moc.liamg@7bob | wleff5re | bcrypt |
| ... | | | |

Table 302

ACCOUNT DATA 104

METHOD OF DETECTION OF COMPTROMISED ACCOUNTS

BACKGROUND

Last year over a billion accounts were exposed over internet and every year hundreds of millions of accounts are compromised in various acts of cyber-crimes. A report by Gemalto claims that more than a billion accounts were compromised during the year 2014. The report also highlights a shift in tactics by cyber criminals, traditionally cyber criminals targeted credit card information; but more recently, the aim is found to be identity theft. Stolen identities can then be used for various malicious activities like registration of fake credit cards, sold to marketers or creation of fake accounts.

For example, people usually tend to use the same identifier and password for various portals. Therefore, if the account information has been compromised once at one particular portal, there are chances that the stolen or compromised information can be used multiple times on various other portals. Hence, the confidentiality, concealment and privacy of email identifiers along with passwords is important. If any of these is leaked or compromised, the account is considered a compromised account.

SUMMARY

Described herein are techniques and systems for detection of compromised accounts. Various embodiments of this disclosure include obtaining, by a computing device, a user credential including a user ID, and modifying the user ID. The computing device may transmit the modified user ID to a service including a database related to compromised accounts, receive a record corresponding to the modified user ID that includes information of a compromised account, and further determine whether an account of the user ID is compromised based on the received record.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Implementations herein relate to techniques that enable websites and corporate IT systems to detect relevant compromised accounts. The implementations include collecting and storing large amount of compromised account data by a service, which communicates with a website or an IT system. The implementations further include a communication protocol between the service and the website or IT system, and the communication protocol ensures security and privacy of user credentials without sacrificing usability of compromised account detection.

For example, the implementations may help websites or enterprise IT systems to detect compromised accounts (e.g., the accounts whose credentials have already been exposed on the Internet). The websites or enterprise IT systems may provide anonymized user ID to the service and then determine whether an account associated with the user ID is compromised. During the process, concerns such as security, visibility, and risks of exposure of sensitive data are addressed.

Illustrative Environment

Figure 1:
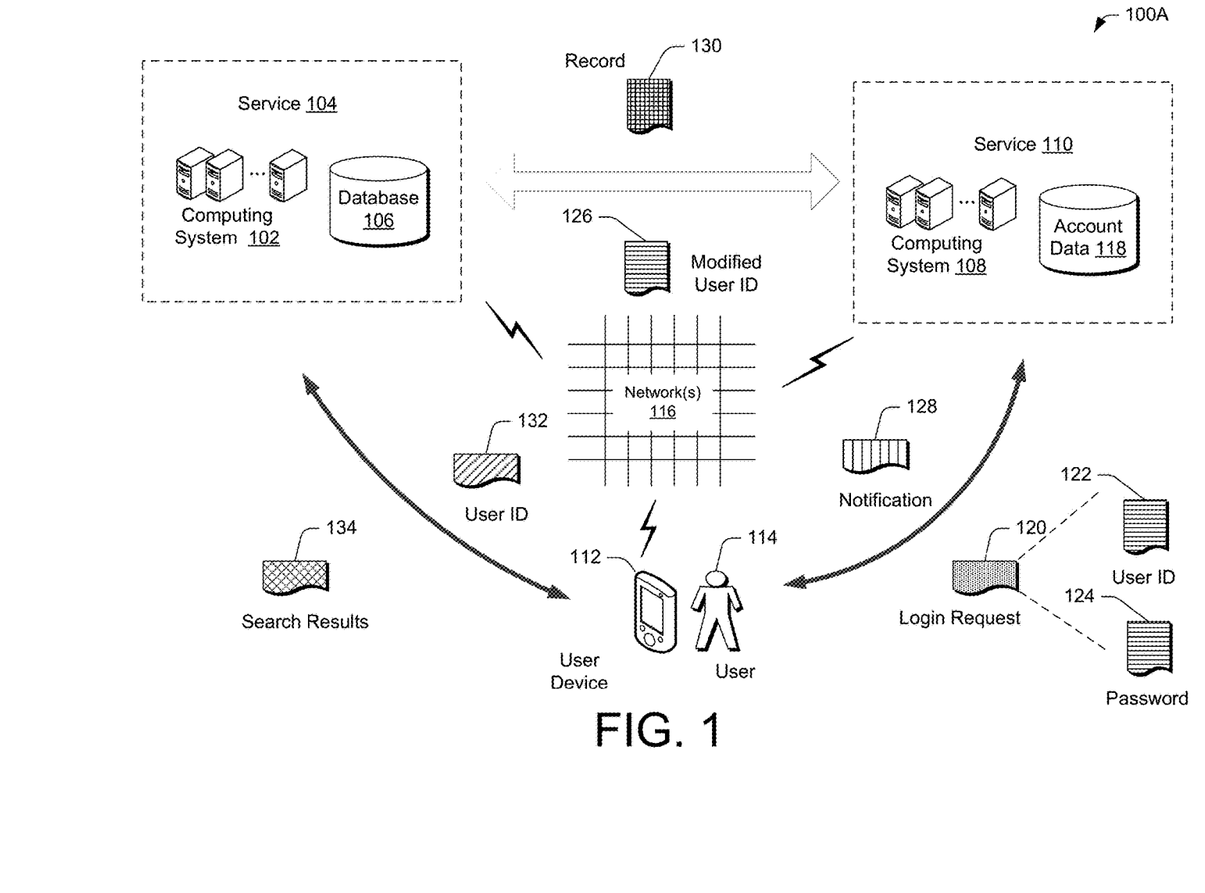
FIG. 1 is a diagram of an illustrative computing environment that includes a computing architecture for detection of compromised accounts.

FIG. 1 is a diagram of an illustrative computing environment 100 that includes a computing architecture for detection of compromised accounts. The environment 100 includes a computing system 102 associated with a service 104. The computing system 102 may include a server or a collection of servers in a distributed configuration (e.g., cloud computing service, server farm, etc.) or non-distributed configuration. The service 104 includes a set of related hardware/software functionalities that may be reused for different purposes, together with the policies that, for example, detect compromised accounts. A compromised account refers to a piece of user credential (e.g., user ID and password pair) which has been exposed to the public.

The service 104 may collect data related to compromised accounts and stored the data in a database 106. The service 104 may be implemented by the computing system 102 that further communicated with other devices such as a computing system 108 associated with a service 110 and a user device 112 associated with a user 114 via a network 116. The computing system 108 may include a server or a collection of servers in a distributed configuration (e.g., cloud computing service, server farm, etc.) or non-distributed configuration.

The network 116 may include wired and/or wireless networks that enable communications between the various computing devices described in environment 100. In some embodiments, the network 116 may include local area networks (LANs), wide area networks (WAN), mobile telephone networks (MTNs), and other types of networks, possibly used in conjunction with one another, to facilitate communication between the various computing devices (e.g., the computing system 102, the computing system 108, and the user device 112).

The service 110 includes a set of related hardware/software functionalities that may be reused for different purposes, together with the policies that enable various provisions such as online shopping and social networking. The service 110 may manage account data 118 that includes data of various user accounts.

In some implementations, the computing device may receive a login request 120 from the user device 112. The login request may include user credential, for example, including a user identifier (ID) 122 and a password 124 associated with the user ID 122. In some instances, the user ID 122 may include an email address, a phone number, or other information used to identify the user 114. For example, the user 114 may attempt to login to the service 110 using the user ID 122 (e.g., abc@a.com).

The service 110 may communicate with the service 104 to ensure security and safeguard. The computing system 108 may mark out the N characters of the user ID 122 to generate a modified user ID 126, and N can range, for example, anywhere from 2 to 4 depending upon the discretion of the service 110. For example, the first N characters of the user ID 122 may be marked when the user ID is an email address; the last N characters of the user ID 122 may be marked when the user ID is a phone number. As used herein, marking refers to "hiding", "replacing", "obscuring" or other operations that may be performed to anonymize the user ID 122.

For example, the user ID 122 may be visible as c@a.com to the service 104 such that the user ID 122 remains confidential to the service 104. The modified user ID 126 is submitted to the computing system 102. The computing system 102 may use the modified user ID 126 to query the database 106, which stores huge amount of compromised account data. The computing system 102 may find one or more compromised records that match a pattern of the modified user ID 126**. An individual record may include a user ID (e.g., an email ID), a password hash, salt, and one or more hash algorithms.

In some implementations, the service 104 may identify a record 130 that matches the modified user ID 126. The computing system 102 may return the record 130 to the service 110, which then determines whether an account associated with the user ID 122 is compromised. If the account is compromised, the computing system may generate a notification 128 and provide the notification 128 to the user device 112.

In some implementations, the user device 112 may communicate with the service 104 to evaluate whether an account of the user 114 is compromised. For example, the user device 112 may transmit a user ID 132 to the computing system 102, and the user ID 132 may be modified to obscure a portion of a real user ID of the user 114. Based on the user ID 132, the computing system 102 may determine whether an account ID shares a pattern of the user ID 132. The computing system 102 may provide a search result 134 to the user device 112.

Illustrative Architecture

Figure 2:
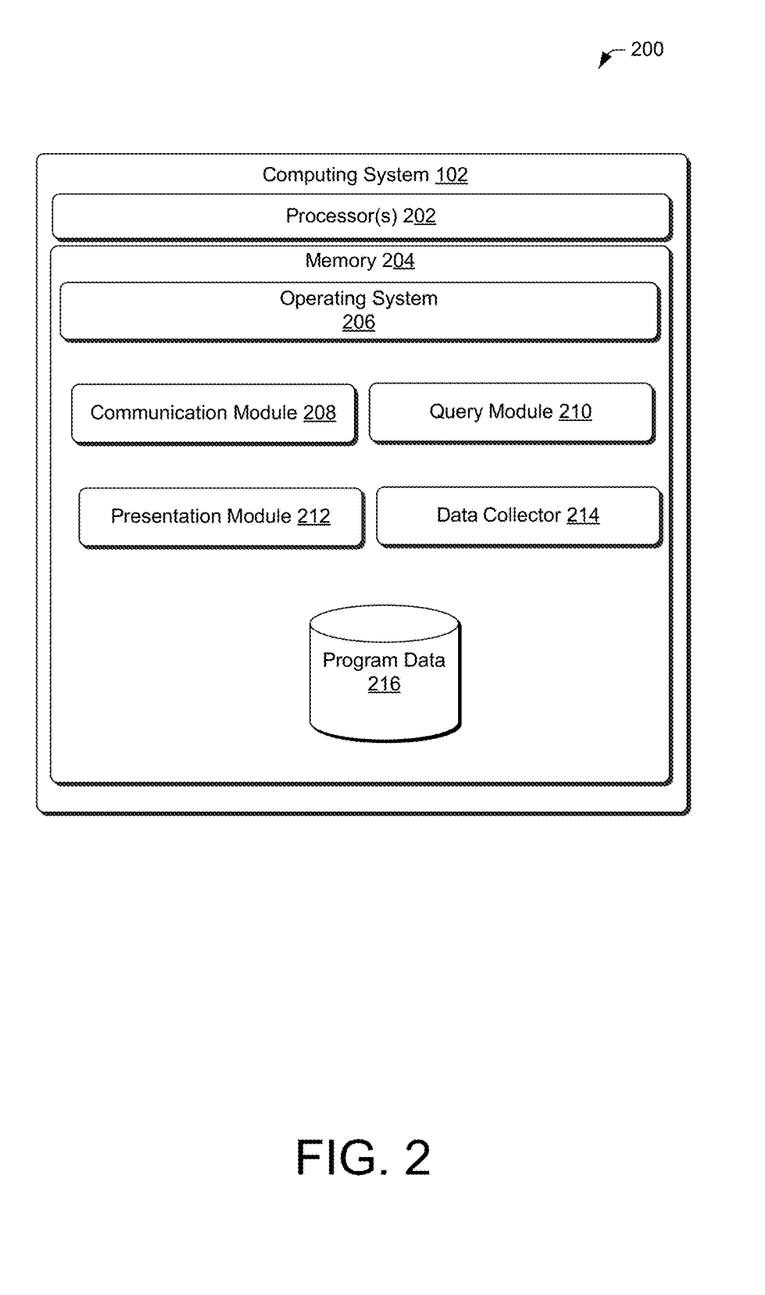
FIG. 2 is a schematic diagram of an illustrative computing architecture to enable detection of compromised accounts.

FIG. 2 is a schematic diagram of an illustrative computing architecture 200 to enable detection of compromised accounts. The computing architecture 200 shows additional details of the computing system 102, which may include additional modules, kernels, data, and/or hardware.

The computing architecture 200 may include processor(s) 202 and memory 204. The memory 204 may store various modules, applications, programs, or other data. The memory 204 may include instructions that, when executed by the processor(s) 202, cause the processor(s) 202 to perform the operations described herein for the computing system 102. The processors 202 may include one or more graphics processing units (GPU) and one or more central processing units (CPU).

The computing system 102 may have additional features and/or functionality. For example, the computing system 102 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data 216, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing system 102. Any such computer storage media may be part of the computing system 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 204 may store an operating system 206 as well as a communication module 208, a query module 210, a presenting module 212, and a data collector 214.

The communication module 208 may be configured to receive the user ID 126 associated with the user 114 from the computing system 108. The user ID 126 may include one or more obscured letters. For example, the user ID may include an email address of the user, and the ID may include the unobscured letters of the user ID.

The query module 210 may be configured to search the database 106 to identify a record (e.g., the record 130) based on the user ID 126. The database 106 includes a plurality of records associated with compromised accounts.

In some implementations, the record 130 may include a user ID matching a pattern of unobscured letters of the user ID 126, a hashed password corresponding to the user ID, and one or more hash algorithms associated with the hashed password. For example, the one or more hash algorithms may include at least one of BCrypt, MD5, or SHA1.

In some implementations, the one or more hash algorithms may include a first hash algorithm associated with the system and a second hash algorithms associated with a third party system (e.g., online compromised accounts providers), and the hashed password have been hashed using the first hash algorithm and the second hash algorithm.

The presenting module 212 may be configured to transmit information of the record 130 to the computing system 108. For example, the information of the identified record may include the user ID matching a pattern of unobscured letters of the user ID, the hashed password associated with the user ID, the one or more hash algorithms, and random data associated with the one or more hash algorithms.

The data collector 214 may be configured to collecting data associated with a plurality of compromised accounts. For example, an individual compromised account of the plurality of compromised accounts may include a compromised ID and a password associated with the compromised ID, and the compromised ID including a plurality of letters. The data collector 214 may further reverse the plurality of letters of the compromised ID to generate a reversed compromised ID, and perform an index operation on reversed compromised IDs of the plurality compromised accounts prior to the searching the database 106.

For example, when the login request 120 is made, the service 110 may anonymize an email ID associated with the user 114. The service 110 may mark the first N letters, and N can range from 2 to 4 first letter of the email. The marking ensures that email ID even remain anonymous to the service 104. The anonymized email is then reversed. Accordingly, a query along with the anonymized email is submitted to the database that contains a list of compromised accounts for checking and verification. If the user credential is not compromised, the service 104 may not find a record of any of the values. In these instances, an empty record may be sent to the service 110. If the user credential is compromised, the service 104 may send the record 130 to the service 110.

Figure 3:
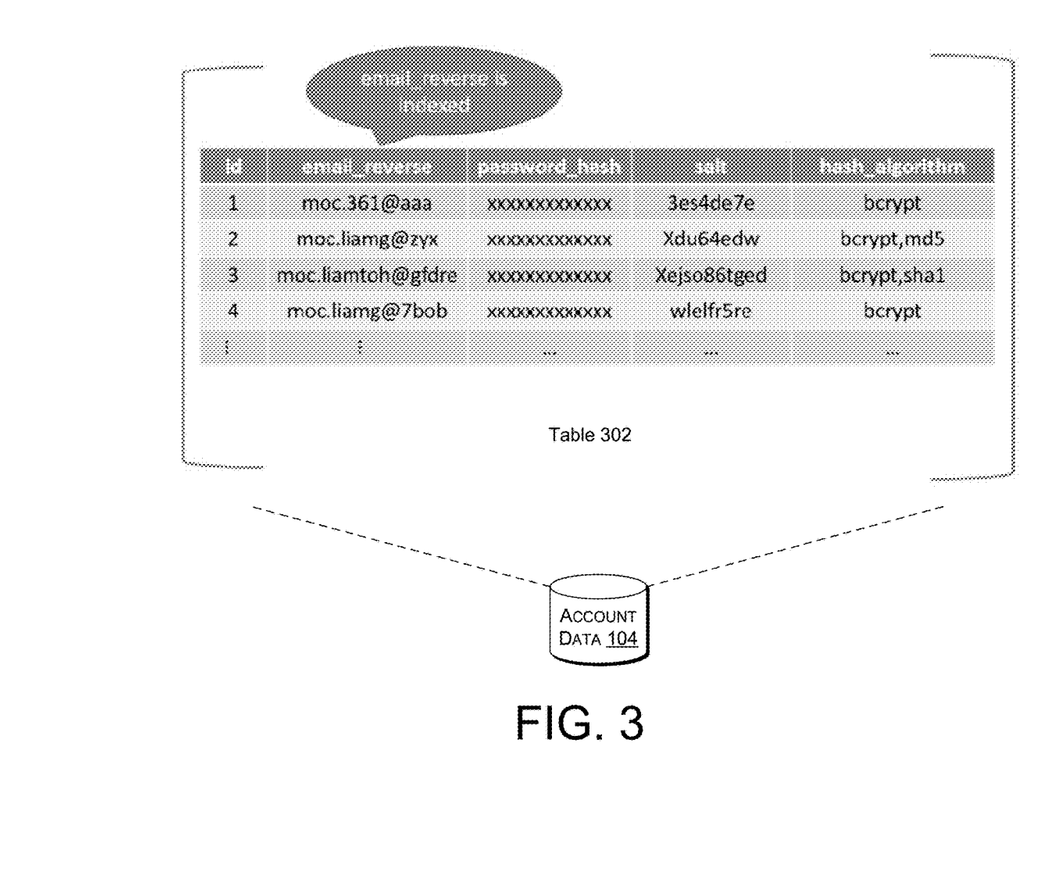
FIG. 3 is a diagram of an illustrative scheme that includes various records processed by a computing architecture illustrated in FIG. 1.

FIG. 3 is a diagram of an illustrative scheme that includes various records processed by a computing architecture illustrated in FIG. 1. In some implementations, a database structure of the database 106 may be represented using for example a table 302. For example, the number of rows or record depends upon the number of compromised accounts in the database 106. The first column is id, which is a unique id or primary key for the tuple. The second column or attribute is the reversed email, an email xyz@gmail.com may be stored in a reversed order like moc.liamg@zyx in the database. The reversing process facilitates indexing and anonymized query processing. A password may be stored in form of the hashed value. The third column represents a salt value, namely random data that is used as an additional input to a one-way function that hashes a password or passphrase. The salt is used to safeguard the password against dictionary attacks and also against pre-computed rainbow table attacks. Further, one or more hash algorithms are stored in a column.

Figure 4:
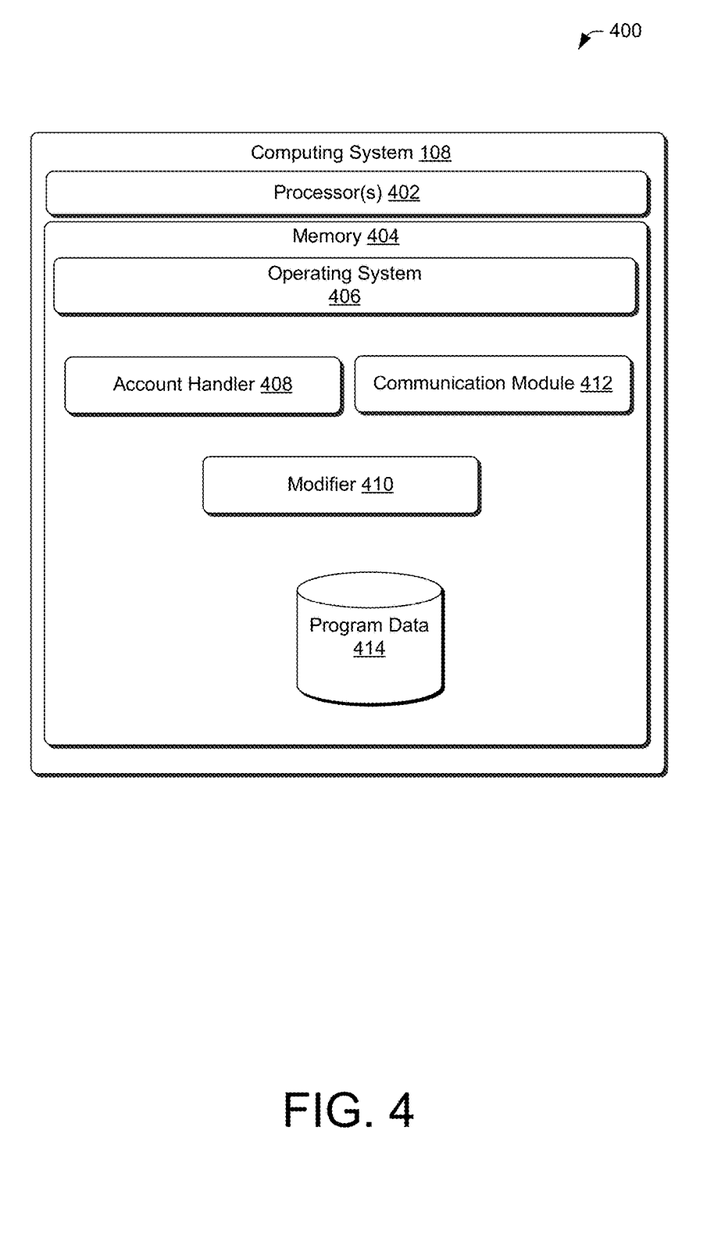
FIG. 4 is another schematic diagram of an illustrative computing architecture to enable detection of compromised accounts.

FIG. 4 is a schematic diagram of an illustrative computing architecture 400 to enable detection of compromised accounts. The computing architecture 400 shows additional details of the computing system 108, which may include additional modules, kernels, data, and/or hardware.

The computing architecture 400 may include processor(s) 402 and memory 404. The memory 404 may store various modules, applications, programs, or other data. The memory 404 may include instructions that, when executed by the processor(s) 402, cause the processor(s) 402 to perform the operations described herein for the computing system 108. The processors 402 may include one or more graphics processing units (GPU) and one or more central processing units (CPU).

The computing system 108 may have additional features and/or functionality. For example, the computing system 108 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data 414, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing system 108. Any such computer storage media may be part of the computing system 108. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 404 may store an operating system 406 as well as an account handler 408, a modifier 410, and a communication module 412. The account handler 408 may be configured to receive, from a user device, a user credential that include the user ID 122 and the password 124. The modifier 410 may modify the user ID 122 by obscuring one or more letters of the user ID 122 to generate the modified user ID 126.

The communication module 412 may transmit the modified user ID 126 to the computing system 102, and receive the record 130 corresponding the modified user ID 126. The record 130 may include a user ID including unobscured letters of the user ID 126, a hashed password corresponding to the ID, and one or more hash algorithms associated with the hashed password.

The account handler 408 may further determine whether the ID of the record matches the user ID 122. In response to a determination that the ID of the record 130 matches the user ID 122, the account handler 408 may perform a hash operation on the password 124 using the one or more hash algorithms of the received record 130 to generate a hashed password corresponding to the user ID 122.

The account handler 408 may further determine whether the generated hashed password corresponding to the user ID 122 matches the password corresponding to the ID. In response to a determination that the generated hashed password matches the password associated with the ID, the communication module 412 may generate the notification 128 based on the user credential. For example, the notification may indicate that an account associated with the user credential is compromised. The communication module 412 may further provide the notification to the user device 112.

In some implementations, when a login request is made, the service 110 may anonymize an email ID associated with the user 114. The service 110 may mark the first N letters, and N can range from 2 to 4 first letter of the email. The marking ensures that email ID even remain anonymous to the service 104. The anonymized email is then reversed. Accordingly, a query along with the reversed email is submitted to the database that contains a list of compromised accounts for checking and verification. If the user credential is not compromised, the service 104 may not find a record of any of the values. In these instances, an empty record may be sent to the service 110. If the user credential is compromised, the service 104 may send the record 130 to the service 110.

In these instances, the record 130 may include a user ID, salt and password hashes. Accordingly, after receiving the record 130, the service 110 may determine whether the user ID is matched with the user ID 122. If the user ID is not present in the account data 118 and a record match is not found, the service 110 may allow the user 114 to login on to the service 110. If the user ID is present in the account data 118, salt or the random text would be used to compute the password hash to evaluate the password. The password hash may be checked for availability in records. If the password hash is not found on the account data, the user 114 may be allowed to login on to the service 110. If the password hash is also found in the account data 118, the service may consider this account as a compromised account and report as a compromised account. Once an account is confirmed to be compromised, the service 110 may send a request to the user to, for example, initialize a password resetting process.

Illustrative Process

Figure 5:
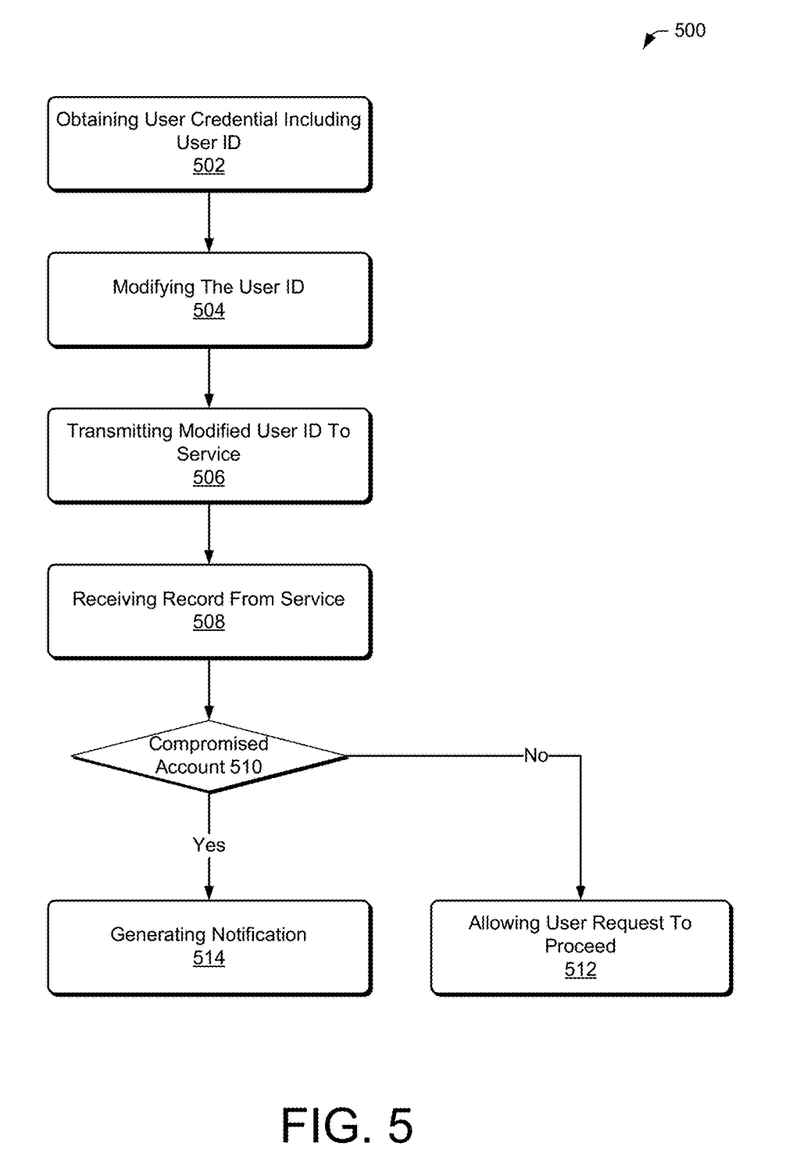
FIG. 5 is a flow diagram of an illustrative process for detection of compromised accounts.

FIG. 5 is a flow diagram of an illustrative process 500 for detection of compromised accounts. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 500 is described with reference to the computing environment 100. However, the process 500 may be implemented using other schemes, environments, and/or computing architecture.

At 502, the computing system 108 may obtain a user credential including the user ID 122. For example, the user credential may include the password 124, and the user ID may include an email address and/or a phone number of the user 114.

In some implementations, the computing system 108 may further receive a login request including the user credential prior to obtaining the user credential. In some implementations, the computing system 108 may receive a query for a compromised record that indicates whether a user account is compromised and, the query may include the user credential.

At 504, the computing system 108 modify the user ID 122 to anonymize the user ID 122 to generate the modified user ID 126. In these instances, the modified user ID 126 may include unobscured letters of the user ID 122. For example, the computing system 108 may anonymize the user ID 122 by obscuring one or more letters of the user ID 122.

At 506, the computing system 108 transmit the modified user ID 122 to the computing system 102. In some implementations, the computing system 108 may determine a user account for a compromising evaluation in a predetermined time period, and the user account corresponds to the user credential. In these instances, the computing system 108 may transmit random data associated with a hash to the computing device associated with the service 104. For example, the computing system 102 may receive the random data and search the database 106 based on the hashed password that are generated by the random data and the hash.

At 508, the computing system 108 may receive the record 130 corresponding to the modified user ID 126 that includes information of a compromised account. For example, the record 130 may include an identified ID corresponding to the modified user ID 126, a hashed password corresponding the ID, and one or more hash algorithms associated with the hashed password. For example, the one or more hash algorithms may include at least one of BCrypt, MD5, or SHA1.

In some implementations, the one or more hash algorithms may include a first hash algorithm associated with the security service provider and a second hash algorithms associated with a third party system. In these instances, the hashed password has been hashed using the first hash algorithm and the second hash algorithm. In some implementations, the record 130 may further include random data associated with the one or more hash algorithms.

At 510, the computing system 108 may determine whether an account of the user ID 122 is compromised based on the received record 130. For example, the computing system 108 may determine whether the account of the user ID 122 is compromised based on the ID corresponding to the modified user ID 126, the hashed password associated with the ID, and one or more hash algorithms associated with the hashed password.

In some implementations, the computing system 108 may determine that the identified ID matches the user ID, and then perform a hash operation on the password 124 to generate a hashed user password corresponding to the user ID 122. The computing system 108 may determine whether the hashed user password corresponding to the user ID 122 matches the hashed password associated with the identified ID in the record 130.

In response to a determination that the identified ID does not match the user ID 122 (the "No" branch of the operation 510), the computing system 108 may allow the user 114 to proceed the login process at 512. In some implementations, the computing system 108 may label the account as uncompromised.

In response to a determination that the identified ID matches the user ID 122 (the "Yes" branch of the operation 510), the computing system 108 may generate the notification 128 based on the user credential at 514 and provide the notification 128 to the user 114. For example, the notification 128 may indicate that an account associated with the user credential is compromised.

In some implementations, the computing system 108 obtain the user ID 122 and the password 124 from the user device 112 or the account data 118. The computing system 108 then anonymizes the user ID 1122 by obscuring N letters of the user ID 122 and sends the modified user ID 126 to the computing system 102. The computing system 102 uses the modified user ID 126 to query the database 106 including large amount of compromised account data and to identify the records which match a pattern of the modified user ID 126. Each record includes a user ID, password hash, salt, and hash algorithm. The retrieved records (e.g., the record 130) then are sent back by the computing system 102 to the computing system 108, which further uses the real user ID (e.g., the user ID 122) to check whether there are records with same user ID. If a match is found, the computing system 108 gets the salt and hash algorithm from the corresponding record and compute the hash with the password 124. If this hash matches the password hash in the record, the computing system 108 reports to the service 110 that a compromise has been detected. Because the computing system 108 is inside or under the control of the service 110, the password 124 may not be exposed to any $3^{rd}$ party and the service 104.

In these instances, the service 104 communicates with the service 110 in an anonymized manner and the service 104 is not aware of exact user IDs. The service 110 marks the three letters of the login ID and the service 104 is unable to know the exact user IDs. The anonymous id not only facilitates in maintaining privacy of users but is a mechanism of safeguard against phishing attacks. The security is further strengthened against any "brute force" attack aimed at guessing the output of these algorithms by the application of salt technique. For example, some random data may be added to the hashed word and the output of password hash algorithm and the salt random data may be hashed in a one-dimensional one-way hash process to a secure and theft resistant password. Hence a hash algorithm or salted hashed passwords are generated. This is the process make the user ID 122 and the password 124 secured.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for detection of a compromised user accounts by brute-force attacks, the method comprising:
    receiving, by one or more processors of a computing device from a user device, a user credential that comprises a user identifier (ID) and a password that are associated with a user;
    anonymizing, by the one or more processors, the user ID by obscuring one or more letters of the user ID without altering length of the user ID;
    transmitting, by the one or more processors, the anonymized user ID to a server associated with the detection of the compromised user accounts by the brute-force attacks;
    receiving, by the one or more processors from the server, a record corresponding the anonymized user ID, the record comprising:
        an ID comprising unobscured letters of the user ID,
        a hashed password corresponding to the ID,
        one or more hash algorithms associated with the hashed password, and
    determining, by the one or more processors, whether the ID of the record matches the user ID;
    in response to a determination that the ID of the record matches the user ID, performing a hash operation on the password associated with the user using the one or more hash algorithms of the received record to generate a hashed password corresponding to the user ID;
    determining, by the one or more processors, whether the generated hashed password corresponding to the user ID matches the password corresponding to the ID; and
    in response to a determination that the generated hashed password matches the password associated with the ID, generating, by the one or more processors, a notification based on the user credential, the notification indicating that an account associated with the user credential is compromised.

2. A method for detection of compromised user accounts, the method comprising: obtaining, by one more processors of a computing device, a user credential comprising a user ID;
    modifying, by one or more processors, the user ID to anonymize the user ID, by obscuring one or more letters of the user ID without altering length of the user ID;
    transmitting, by the one or more processors, the modified user ID to a computing device associated with a security service provider;
    receiving, by the one or more processors from the computing device associated with the security service provider, a record corresponding to the modified user ID that comprises information of a compromised account;
    the record comprising: an ID comprising unobscured letters of the user ID, a hashed password corresponding to the ID, one or more hash algorithms associated with the hashed password;
    and determining, by the one or more processors, whether an account of the user ID is compromised based on the received record,
    in response to the determination that an account of the user ID is compromised based on the received record, performing a hash operation on the password associated with the user using the one or more hash algorithms of the received record to generate a hashed password corresponding to the user ID;
    determining, by the one or more processors, whether the generated hashed password corresponding to the user ID matches the password corresponding to the ID; and
    in response to a determination that the generated hashed password matches the password associated with the ID, generating, by the one or more processors, a notification based on the user credential, the notification indicating that an account associated with the user credential is compromised.

3. The method of claim 2, wherein the determining whether the account of the user ID is compromised based on the received record comprises determining whether the account of the user ID is compromised based on the ID corresponding to the modified user ID, the hashed password associated with the ID, and one or more hash algorithms associated with the hashed password.

4. The method of claim 3, wherein the modifying the user ID to anonymize the user ID comprises anonymizing the user ID by obscuring one or more letters of the user ID.

5. The method of claim 4, wherein the anonymized user ID comprises unobscured letters of the user ID.

6. The method of claim 3, wherein the credential further comprises a password of the user, and the user ID comprises an email address of the user.

7. The method of claim 6, wherein the determining whether the account of the user ID is compromised based on the received record comprises:
    determining that the ID matches the user ID;
    performing a hash operation on the password of the user to generate a hashed user password corresponding to the user ID; and
    determining whether the hashed user password corresponding to the user ID matches the hashed password associated with the ID.

8. The method of claim 7, further comprising in response to a determination that the hashed user password of the user ID matches the hashed password associated with the ID:
    generating a notification based on the user credential, the notification indicating that an account associated with the user credential is compromised, and
    providing the notification to the user.

9. The method of claim 3, wherein the one or more hash algorithms comprise at least one of bcrypt file encryption utility (BCrypt), MD5 message-digest algorithm (MD5), or Secure Hash Algorithm 1 (SHA1).

10. The method of claim 3, wherein the one or more hash algorithms comprises a first hash algorithm associated with the security service provider and a second hash algorithms associated with a third party system, and the hashed password have been hashed using the first hash algorithm and the second hash algorithm.

11. The method of claim 3, wherein the record further comprises random data associated with the one or more hash algorithms.

12. The method of claim 3, further comprising:
receiving a login request comprising the user credential;
receiving a query for a compromised record that indicates whether a user account is compromised, the query comprising the user credential; or
determining a user account for a compromising evaluation in a predetermined time period, the user account corresponding to the user credential, and
transmitting random data associated with a hash to the computing device associated with the security service provider.

\* \* \* \* \*